US008667769B2

(12) United States Patent
Pierson

(10) Patent No.: US 8,667,769 B2
(45) Date of Patent: Mar. 11, 2014

(54) APPLYING LIQUID BIODEGRADING AGENTS TO GUIDED HARVEST RESIDUE

(76) Inventor: Douglas C. Pierson, Slayton, MN (US)

( * ) Notice: Subject to any disclaimer, the term of this patent is extended or adjusted under 35 U.S.C. 154(b) by 337 days.

(21) Appl. No.: 12/773,090

(22) Filed: May 4, 2010

(65) Prior Publication Data

US 2010/0205922 A1    Aug. 19, 2010

Related U.S. Application Data

(60) Continuation-in-part of application No. 12/649,503, filed on Dec. 30, 2009, now Pat. No. 7,814,737, which is a division of application No. 11/747,529, filed on May 11, 2007, now Pat. No. 7,658,058.

(51) Int. Cl.
    *A01D 45/02*    (2006.01)
(52) U.S. Cl.
    USPC ............................. 56/119; 56/16.8; 56/14.3
(58) Field of Classification Search
    USPC .................. 56/14.3, 17.3, 17.4, 27.5, 119, 56/233–237, 327.1, 327.2, 16.4, 16.8, 51, 56/52, 103; 239/172
    See application file for complete search history.

(56) References Cited

U.S. PATENT DOCUMENTS

| | | | |
|---|---|---|---|
| 1,878,941 A | 9/1932 | Lindgren | |
| 1,894,412 A | 1/1933 | Neighbour | |
| 2,252,159 A * | 8/1941 | Blank | 56/104 |
| 2,301,213 A * | 11/1942 | Kang | 47/1.7 |
| 2,440,757 A * | 5/1948 | Peters | 172/81 |
| 2,501,555 A * | 3/1950 | White | 239/175 |
| 2,661,586 A | 12/1953 | Krause et al. | |
| 2,700,858 A * | 2/1955 | Bulfer | 56/14.2 |
| 2,989,834 A | 6/1961 | Pool et al. | |
| 3,436,901 A | 4/1969 | Gehman et al. | |
| 3,462,928 A | 8/1969 | Schreiner et al. | |
| 3,534,533 A * | 10/1970 | Luoma | 56/16.8 |
| 3,584,787 A * | 6/1971 | Thomason | 239/121 |
| 3,628,316 A | 12/1971 | Rea, Sr. | |
| 3,719,034 A | 3/1973 | Lange | |
| 3,747,311 A | 7/1973 | DeCoene et al. | |
| 3,808,783 A | 5/1974 | Sutherland et al. | |
| 3,866,397 A * | 2/1975 | Koziol | 56/16.8 |
| 3,959,924 A * | 6/1976 | Allen, Jr. | 47/1.43 |
| 4,002,010 A * | 1/1977 | Da Silva Passos | 56/126 |
| 4,182,098 A | 1/1980 | Kass | |
| 4,240,244 A * | 12/1980 | Martin | 56/16.4 R |
| 4,251,980 A | 2/1981 | Miller | |
| 4,327,537 A * | 5/1982 | Wolrab | 56/1 |
| 4,369,596 A | 1/1983 | Hartford | |
| 4,429,516 A | 2/1984 | Erickson | |
| 4,525,988 A | 7/1985 | Harlan | |
| 4,539,799 A * | 9/1985 | Kalverkamp | 56/60 |
| 4,604,857 A * | 8/1986 | Maher | 56/16.4 R |
| 4,662,163 A * | 5/1987 | Adams | 56/341 |
| 4,704,850 A | 11/1987 | Obermeier | |
| 4,770,112 A | 9/1988 | Neumeyer | |
| 4,864,807 A * | 9/1989 | Ostrup et al. | 56/60 |
| 5,005,345 A * | 4/1991 | Pinckard et al. | 56/71 |
| 5,329,752 A | 7/1994 | Milbourn | |
| 5,533,676 A | 7/1996 | Conley | |
| 5,689,944 A | 11/1997 | Mirosevic | |

(Continued)

*Primary Examiner* — Thomas B Will
*Assistant Examiner* — Joan D Misa
(74) *Attorney, Agent, or Firm* — Fredrickson & Byron, P.A.

(57) ABSTRACT

Apparatus and methods for harvesting a plurality of crop rows guide harvest residue and apply a liquid biodegrading agent thereto, while harvesting the crops.

15 Claims, 11 Drawing Sheets

(56) References Cited

U.S. PATENT DOCUMENTS

| | | |
|---|---|---|
| 5,724,797 A | 3/1998 | Wagstaff et al. |
| 5,806,292 A | 9/1998 | Luecke |
| 5,826,415 A | 10/1998 | Becker |
| 5,910,092 A | 6/1999 | Bennett |
| 6,145,288 A | 11/2000 | Tamian et al. |
| 6,233,840 B1 | 5/2001 | Finney |
| 6,341,481 B1 | 1/2002 | van der Merwe |
| 6,374,586 B1 | 4/2002 | Burch |
| 6,374,587 B1 | 4/2002 | Wubbels et al. |
| 6,494,782 B1 | 12/2002 | Strong et al. |
| 6,497,088 B1 | 12/2002 | Holley |
| 6,871,709 B2 | 3/2005 | Knobloch et al. |
| 7,156,186 B2 | 1/2007 | Knobloch et al. |
| 2,527,190 A1 | 12/2009 | Kuhlman |
| 7,823,807 B1 * | 11/2010 | Bauer ............ 239/688 |
| 2002/0100819 A1 * | 8/2002 | Taylor et al. ............ 239/543 |
| 2002/0104897 A1 * | 8/2002 | Guesdon ............ 239/172 |
| 2003/0226670 A1 | 12/2003 | Knobloch et al. |
| 2005/0120695 A1 | 6/2005 | Calmer |
| 2005/0172597 A1 * | 8/2005 | Lofton ............ 56/16.8 |
| 2007/0026915 A1 | 2/2007 | Anderson et al. |
| 2007/0037620 A1 | 2/2007 | Anderson et al. |
| 2007/0042822 A1 | 2/2007 | Bischoff et al. |
| 2007/0049366 A1 | 3/2007 | Pope |

* cited by examiner

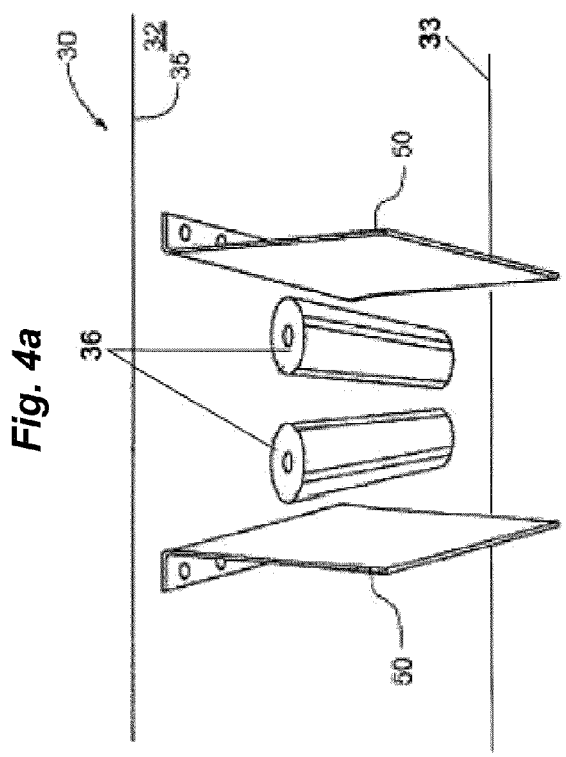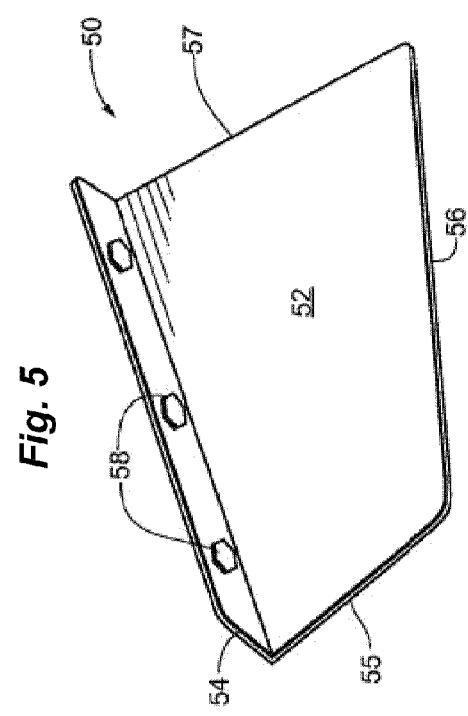

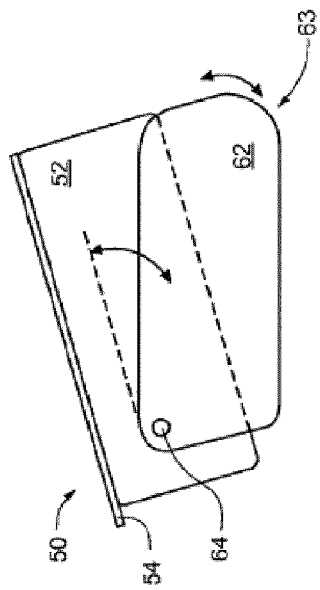
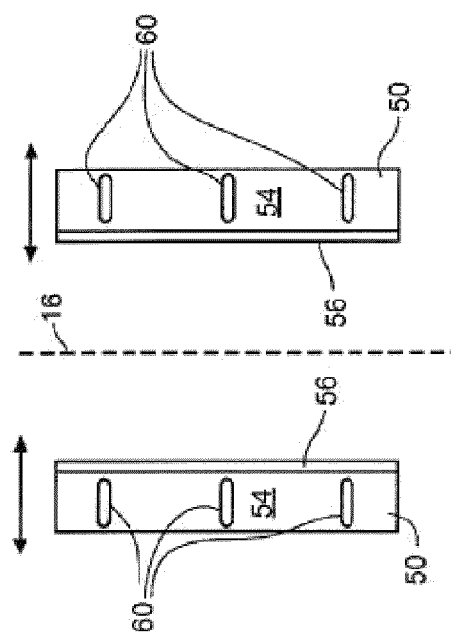
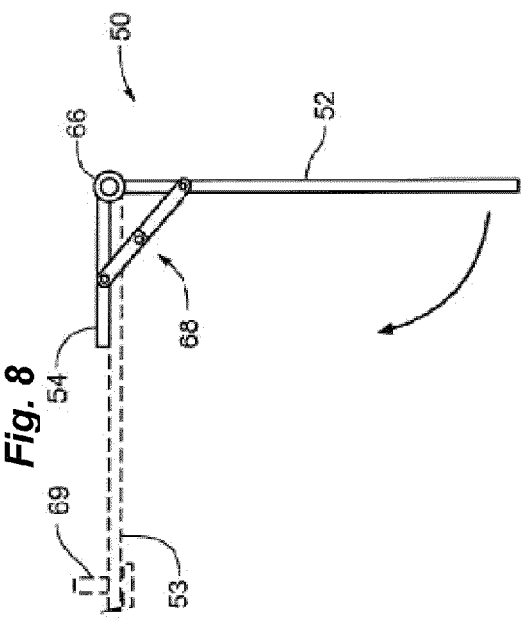

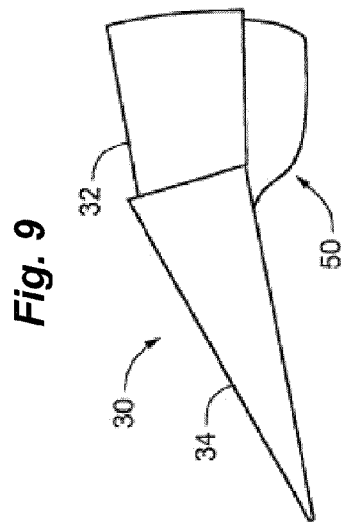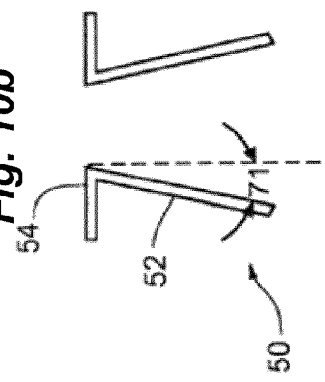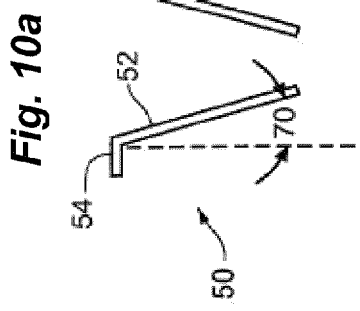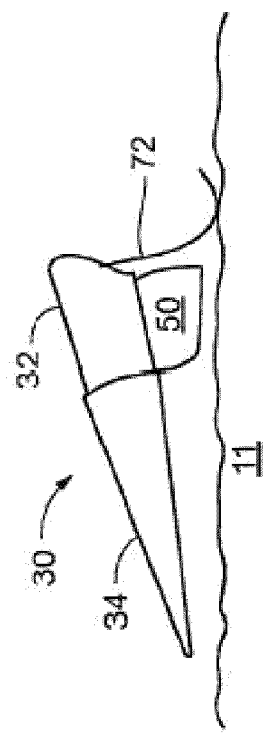

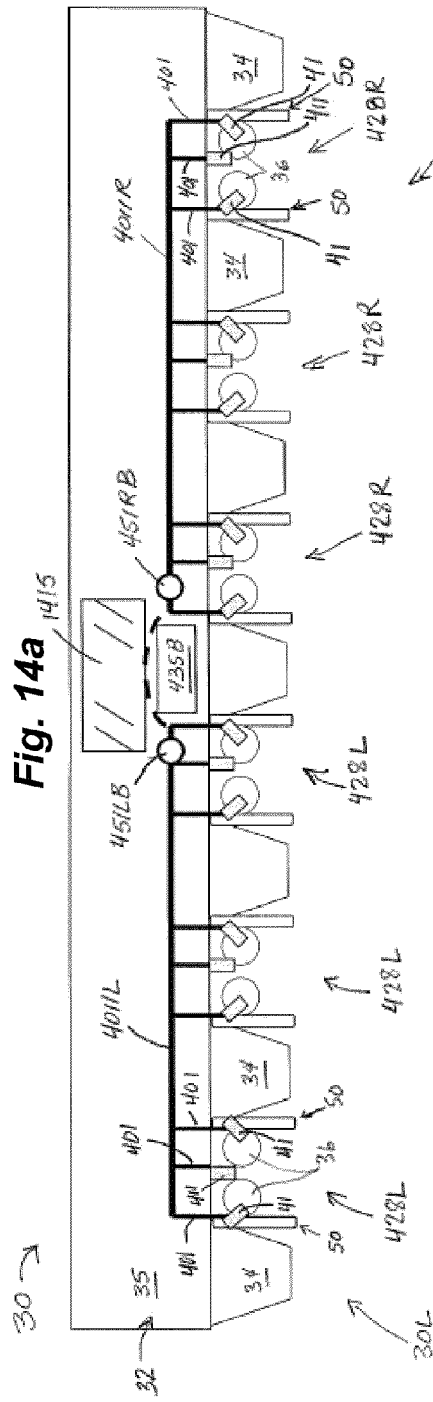
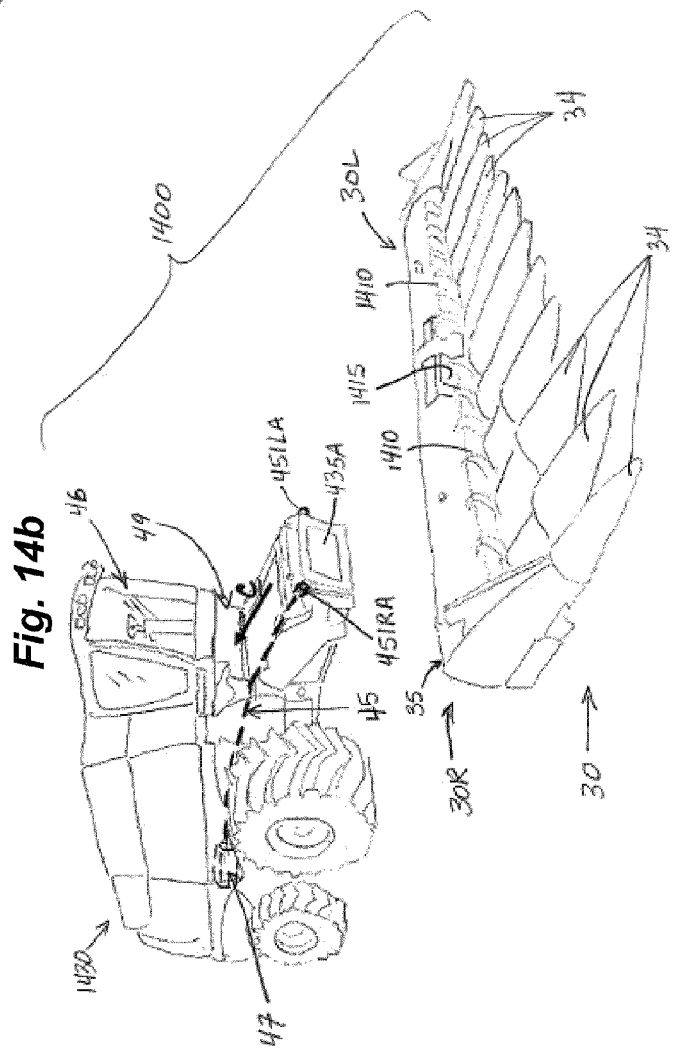

APPLYING LIQUID BIODEGRADING AGENTS TO GUIDED HARVEST RESIDUE

RELATED APPLICATIONS

This application is a continuation-in-part of U.S. patent application Ser. No. 12/649,503, which was filed on Dec. 30, 2009 and is a divisional of U.S. Pat. No. 7,658,058, which was filed on May 11, 2007, the disclosures of both being hereby incorporated by reference.

FIELD OF THE INVENTION

The present invention relates to agricultural harvesting equipment and methods, and more particularly to apparatus and methods that can improve the efficiency and/or effectiveness of farming operations related to harvesting and subsequent planting.

BACKGROUND OF THE INVENTION

In some "conventional" farming operations, the harvesting of crops may result in crop harvest residue (e.g., corn stalks, leaves, tassels, etc.) being distributed somewhat randomly about the surface of a field. After the harvest, a farmer might use equipment such as a stalk chopper to shred the remaining standing stalks and residue. This would then typically be followed by a type of total coverage, deep-tillage pass with plowing equipment such as a moldboard plow, chisel plow, or a v-ripper plow, in order to tear up the soil profile and to incorporate the harvest residue into the soil. In the springtime, prior to planting the next crop, the farmer would again typically need to make one or two passes across the field with tillage tools, such as a field cultivator or disk, to prepare the soil surface to make a seed bed for planting. This harvest, post-harvest, and springtime pattern is essentially the state of the art for most conventional tillage cropping farms in operation today.

"No-till" farming is a term used to describe farming operations which are generally performed without any fall or spring tillage prior to planting. No-till planting equipment is generally equipped with a row cleaner to move the previous year's harvest residue out of the path of the row unit that places the seeds in the soil. No-till planters typically use a wavy coulter that operates at the approximate depth at which the seeds are planted. The waves on the coulter may provide some minimal tillage to allow the planter to operate in loosened soil. In many soil conditions, the coulter does not adequately loosen the dense soil that has not been previously tilled. Sidewall compaction may also result from pressing the soil sideways to form a slot to drop the seeds into. This may make it difficult to achieve good seed-to-soil contact. Poor seed germination and emergence, along with poor root development, are commonly-cited drawbacks of no-till operations, often caused by compacted soil with limited or poorly distributed pore spacing (to hold air and water). Improper pore size and distribution hinders air and water exchange, which may reduce water infiltration and utilization, and may thereby hamper healthy plant development.

"Strip-till" farming is a term that describes an emerging farming practice that has evolved from no-till farming, and can generally be described as tilling relatively narrow strips of soil between rows of the previous year's crop, and subsequently planting rows directly into the tilled strips with a planter row unit. Residue from the harvest (e.g., stalks, leaves, tassels, corn husks, etc.) is typically left as ground cover (as in no-till), and may be distributed somewhat randomly following the harvest. In some operations, strip-tilling may be performed in the fall shortly following the harvest, with planting into the tilled strips occurring the following spring. This process is sometimes also referred to as "no-till with fall strip-tilling." Strip-tilling can also be performed in the spring, prior to or in conjunction with planting, for example, by positioning strip-till equipment ahead of the planter units. In some operations, strip-tilling may be enhanced by the application of fertilizer, preferably (but not necessarily) at the same time as strip-tilling. Anhydrous ammonia, liquid and/or dry fertilizer can be placed into the tilled strips at the same time that the strip-tillage is being performed, for example.

Strip-tilling has been performed using conventional anhydrous ammonia applicators, which may use a coulter, a knife mounted to a shank, or a double disc sealer, for example, and may also use markers or Global Positioning Satellite machine guidance to till and/or layout the strips to be planted in the spring. The shanks, or knives, are typically placed on a toolbar with the same row width as on the planter. For example, if a farmer has an 8-row, 30 inch planter (e.g., for planting 8 rows spaced apart at 30 inch intervals), he might use an 8-row strip-tillage unit to till the strips 30 inches from center-to-center, for example.

One of the difficulties encountered during strip-tilling is that harvest residue can become tangled in strip-till equipment, which can increase the amount of time and resources expended in strip-tilling operations. Another difficulty is that strip-tilling, particularly in the presence of higher crop residues, may result in slower spring warm-up of the soil in the strip till zone (which could delay planting), and may also reduce the effective seed-to-soil contact (which is desired to obtain good germination and crop emergence).

BRIEF DESCRIPTION OF THE DRAWINGS

The present invention will hereinafter be described in conjunction with the following drawing figures, wherein like numerals denote like elements and:

FIG. 4a is a bottom perspective view of a portion of a row unit of a row crop header, according to a particular embodiment;

FIG. 5 is a perspective view of a residue guide for a row crop header, according to some embodiments of the invention;

FIG. 6 is a bottom view of a pair of residue guides, according to some embodiments of the invention;

FIGS. 7-9 are side views of residue guides, according to some alternate embodiments of the invention;

FIGS. 10a and 10b are front views of pairs of residue guides arranged according to alternate embodiments;

FIG. 11 is a side view of a portion of a row crop header including a stalk stomper shoe, in accordance with certain embodiments of the invention;

FIG. 14a is a rear elevation schematic of a row crop header, according to some embodiments of the present invention; and FIG. 14b is a perspective view of a harvesting machine, wherein the row crop header and a drive, control and harvest collection unit of the harvesting machine are positioned side-by-side, the row crop header having been detached from the harvesting machine for the purpose of illustration.

DETAILED DESCRIPTION

Figure 1:
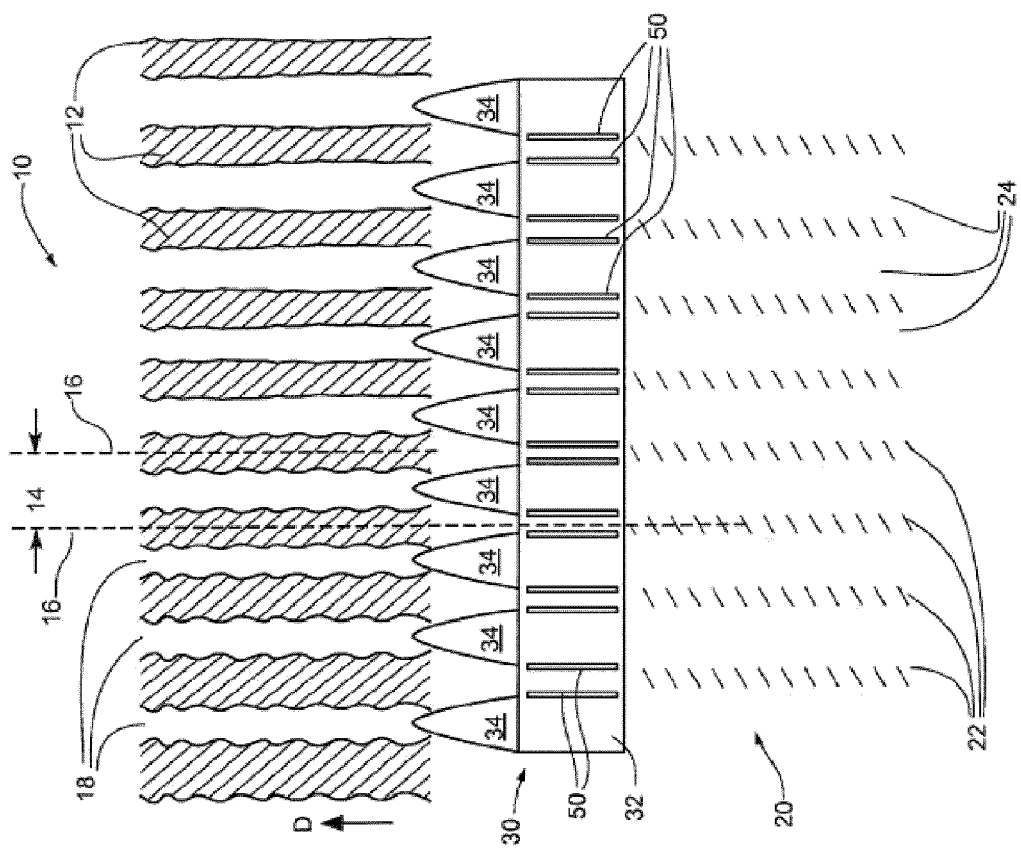
FIG. 1 is a schematic depiction of a row crop header, for use with a harvesting machine, in relation to a row crop, according to some embodiments.

The following discussion is presented to enable a person of ordinary skill in the art to make and use embodiments of the invention. Various modifications to the illustrated embodiments will be readily apparent to those skilled in the art, and the generic principles herein may be applied to other embodiments and applications without departing from the spirit and scope of the invention as defined by the appended claims. Thus, the present disclosure is not intended to limit the described embodiments, but is to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the invention. Skilled artisans will recognize the examples provided herein have many useful alternatives which fall within the scope of the invention as claimed.

Although the examples in this description describe harvesting operations involving corn, the various embodiments of the invention are not so limited, and could apply to other crops such as sunflowers, for example. It should be noted that "corn" as used herein could apply to any of the many variants of corn or maize, such as yellow corn, white corn, sweet corn, indian corn, etc. As used herein, a harvesting machine may be a combine, or any other type of harvesting equipment. Similarly, a row crop header, as used herein, may include a corn header, for example, but may include other types of row crop headers. One example of a row crop header is know as "Rota Disc", which is supplied by Geringhoff of Minot, N. Dak. (see, for example, www.geringhoff.com).

The number of no-till and strip-till farming operations has increased in recent years. The benefits of such farming techniques include soil preservation, for example, by reducing soil erosion. Difficulties are sometimes experienced during strip-tilling operations due to clogging or plugging of strip-tilling equipment with harvest residue. Some commercially available strip-tilling machinery attempts to address this type of difficulty by employing fluted or straight disc coulters and/or trash whipping rotating finger wheels to reduce the harvest residue into a more manageable form and/or move the harvest residue at the time of strip-tilling.

Various embodiments of the present invention facilitate the management of harvest residue at the time of harvest, which management can alleviate the aforementioned problem of plugging and clogging strip-till equipment and can enhance the usefulness of the harvest residue to subsequent crops. For example, at the time of harvesting a crop, embodiments of the invention guide harvest residue of a row crop (such as the corn stalk residue of corn grown in rows) into relatively narrow strips that remain on the field over the rows of the crop that have just been harvested. Furthermore, some preferred embodiments of the present invention also apply liquid bio-degrading agents to the guided harvest residue in order to speed the break down of the residue so that the residue is more readily available as fertilizer for subsequent crops, and so that the residue does not physically interfere with the planting operations of subsequent crops.

FIG. 1 is a schematic depiction of a row crop header 30, for use with a harvesting machine, in relation to a row crop 10, according to some embodiments. An exemplary harvesting machine is shown in FIG. 14b, and will be described in greater detail, below. FIG. 1 illustrates row crop 10 having a plurality of rows 12 spaced apart from one another by a row spacing 14, which may be measured between centers 16 of adjacent rows; areas between rows 12 are designated as areas 18. Row crop 10 may comprise rows of any crop such as corn, sunflowers, etc., and row spacing 14 may be any suitable distance for the particular crop. For example, row spacings compatible with some embodiments of the present invention may include 20, 22, 30, 36, 38, and 40 inches, although the exact spacing and/or units of measurement can be varied from these examples without departing from the scope of the invention as claimed.

Figure 2:
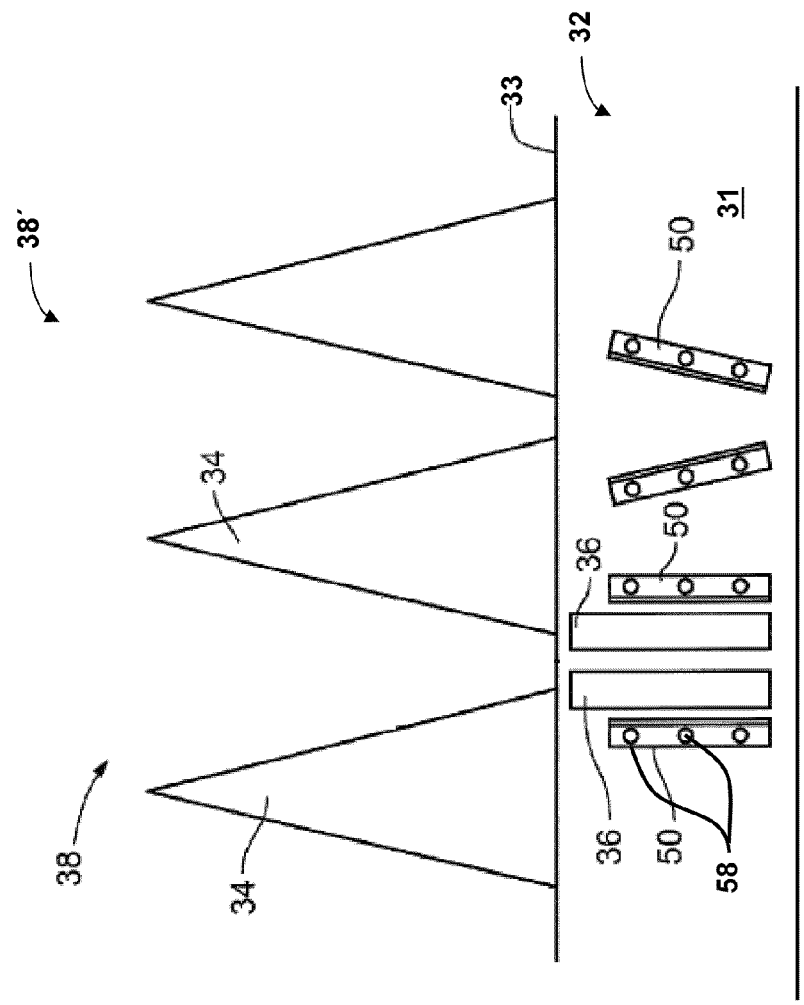
FIG. 2 is an enlarged schematic depiction of adjacent row units for a row crop header, according to certain embodiments.

During harvest operations, a harvesting machine, such as a combine, is navigated through a crop to extract the desired product (e.g., ears of corn), while leaving behind a harvest residue comprising stalks, leaves, and other plant waste. Typically, an attachment at the front of the harvesting machine is used to guide the crop rows into the harvesting machine. FIG. 1 shows row crop header 30, which is adapted to be coupled to the front end of a harvesting machine (for example, as will be described below, in conjunction with FIGS. 14a-b); header 30 includes a plurality of row divider snoots 34, which have a somewhat conical shape and are arranged to guide rows 12 of plants/crops 10 into the harvesting machine. According to the illustrated embodiment, row divider snoots 34 travel substantially in areas 18, between planted rows 12, in order to cause the crops of each row 12 to be guided toward respective centers 16 for harvesting. FIG. 1 illustrates row crop header 30 including a frame 32 to which row divider snoots 34 may be mounted. In FIG. 1, row crop header 30 is shown having nine row divider snoots 34 extending from a forward portion of frame 32, so as to receive and guide eight rows of the crop into the harvesting machine. Of course, the number of rows of crop that can be handled by a row crop header is a matter of design choice and thus, can vary greatly; available corn headers, for example, usually come in 4, 6, 8, 12, 16 and 24 row models, but there may be other row number configurations offered in the machinery market. FIG. 1 further illustrates row crop header 30 including a plurality of pairs residue guides 50, wherein each pair of guides 50 is located rearward of a corresponding pair of adjacent row divider snoots 34 in order to guide harvest residue 20 so that the residue is distributed in relatively narrow strips 22 over the crop rows that have just been harvested by the harvesting machine, as it travels in direction D to drive snoots 34 through the rows of the crop. FIG. 1 shows areas or strips of substantially exposed soil strips 24 created between the relatively narrow strips 22 of harvest residue 20, which strips 24 may facilitate subsequent strip-tilling operations, since this arrangement reduces the likelihood of clogging or plugging of the strip-tilling equipment, and may improve spring soil warm-up and seed-to-soil contact in the subsequently planted crop, and may thereby increase the efficiency and/or effectiveness of strip-tilling operations. With reference to FIGS. 1 and 2, it should be understood that each residue guide 50 projects downwardly from an underside 31 of frame 32, as will be described in greater detail, below.

FIG. 2 is an enlarged schematic depiction of adjacent row units 38, 38' for a row crop header, each unit according to an alternate embodiment. FIG. 2 illustrates row units 38 and 38' each including a pair of residue guides 50 that are fastened to underside 31 of frame 32, and row unit 38 including a pair of stalk rolls 36, which are part of a harvesting mechanism of some embodiments. Stalk rolls 36 are shown located between a corresponding pair of adjacent row divider snoots 34, and with reference back to FIG. 1, will be aligned substantially parallel to the corresponding row center 16 and spaced approximately evenly on either side of row center 16, when row crop header 30 drives snoots 34 into the plurality of crop rows 12, as described above. Each residue guide 50 of row unit 38 is shown disposed in proximity to, and on either side of stalk rolls 36, in order to guide the harvest residue into a corresponding relatively narrow strip 22, as illustrated in FIG. 1. It should be noted that the exact placement of residue guides 50, with respect to the stalk rolls 36 and/or with respect to a forward portion 33 and a rearward portion 35 of the frame 32 may vary from that which is illustrated in FIG. 2, according to alternate embodiments. For example, the spacing of the guides 50 with respect to the row center 16 (FIG. 1) may be made wider or narrower, as desired, thereby affecting the width of strips 22 of harvest residue 20. Also, with reference to row unit 38' of FIG. 2, residue guides 50 of each pair may be oriented at an angle with respect to one another. Residue guides 50 may also be disposed nearer forward portion 33 of frame 32, or nearer rearward portion 35 of frame 32, according to various embodiments of the invention.

With further reference to FIG. 2, each residue guide 50 may be coupled to underside 31 of frame 32 using available attachment devices, such as existing fasteners/bolts 58 that may normally be used to fasten other implements like stationary grass knives, for example. Alternatively, each residue guide 50 may be coupled using other attachment mechanisms, such as by clamps or welding, or by using bolt attachments specifically designed for residue guides 50. Each residue guide may be either permanently or adjustably positioned, and a spacing between each guide 50 of each pair may range from approximately 6 inches to 12 inches. An example of guides that may be adjustably positioned is described in conjunction with FIG. 6, below. Residue guides 50 may be made of sheet metal, for example, or of any other suitable material such as certain plastics, fiberglass and composite materials, for example.

Figure 3:
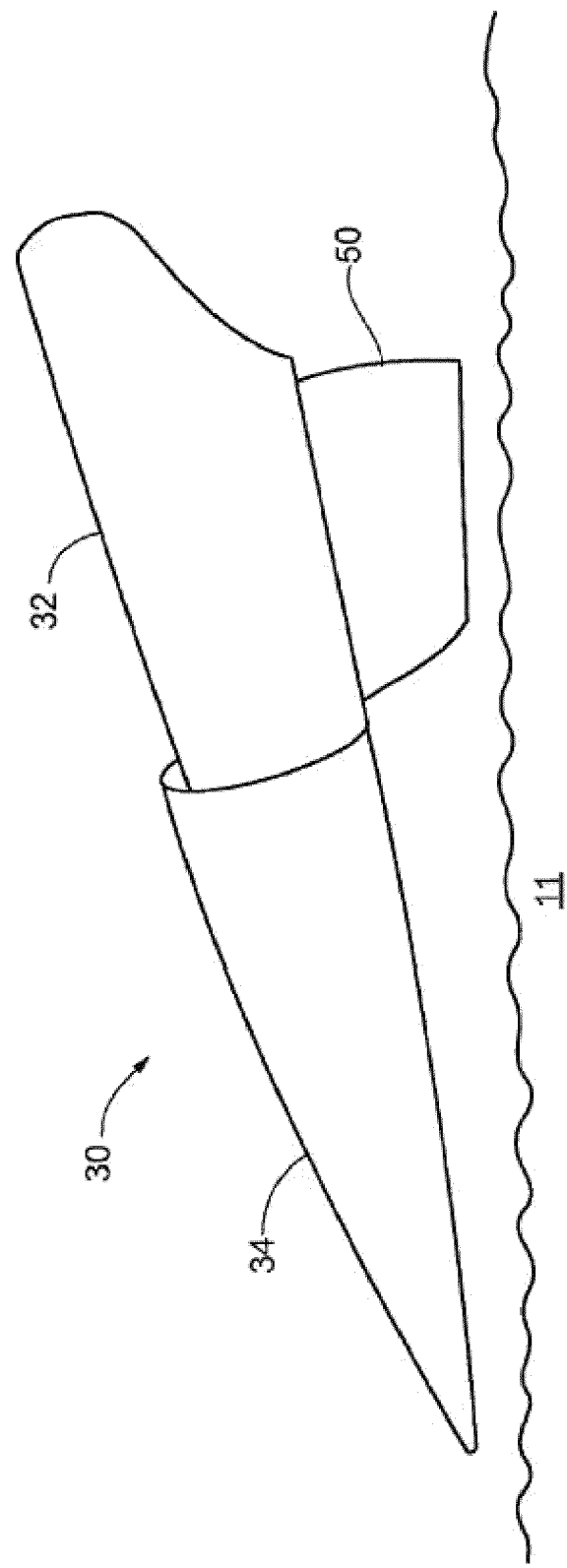
FIG. 3 is a side view of a portion of the row crop header, according to some embodiments.

FIG. 3 is a side view of a portion of row crop header 30 in relation to a soil surface 11, according to some embodiments. FIG. 3 illustrates one of residue guides 50 extending downwardly from frame 32. In operation, row crop header 30 is adapted to operate at a distance above soil surface 11, although it may also be desirable to have a lower portion of each residue guide 50 located relatively close to soil surface 11, for example, to better facilitate the guiding of harvest residue 20.

Figure 4C:
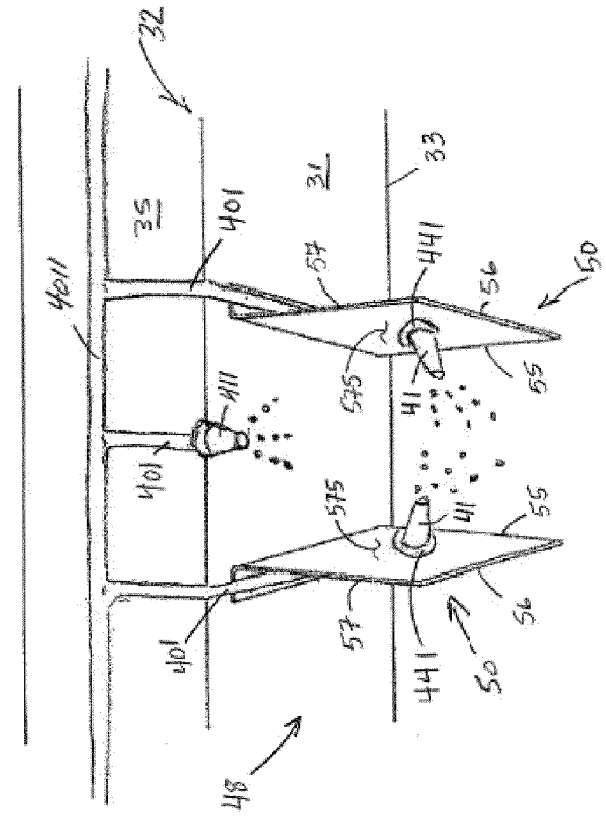
FIGS. 4b-c are bottom perspective views of portions of row units that include spray tips, according to some alternate preferred embodiments of the present invention.
Figure 4B:
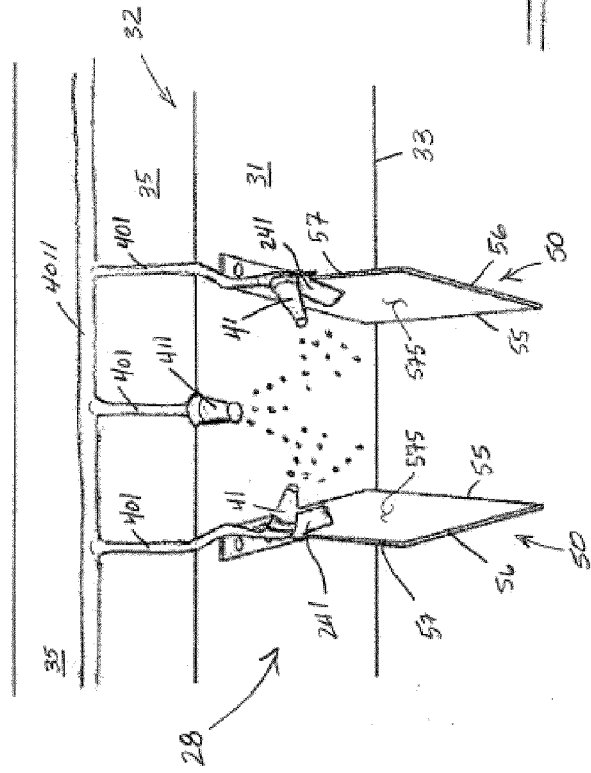

FIG. 4a is a bottom perspective view of a portion of a row unit of a row crop header, according to a particular embodiment. FIG. 4a illustrates one possible arrangement of a pair of stalk rolls 36 and residue guides 50, for example, generally corresponding to that in row unit 38 shown in FIG. 2. FIGS. 4b-c are bottom perspective views of portions of row units 28 and 48, respectively, that each include spray tips 41, arranged according to some alternate embodiments of the present invention. The harvesting mechanism of row units 28, 48 is not shown in FIGS. 4b-c for clarity in illustrating spray tips 41. As previously mentioned, preferred embodiments of the present invention are adapted to apply liquid biodegrading agents to guided harvest residue 20 in order to speed the break down of the residue so that the residue is more readily available as fertilizer for subsequent crops and will not hinder planting of subsequent crops, and the portions of row units 28 and 48, which are illustrated by FIGS. 4b-c, include spray tips 41 for the purpose of applying the liquid to harvest residue 20. FIGS. 4b-c illustrate each spray tip 41 of a pair of spray tips 41 being mounted to a corresponding residue guide 50, and terminating a corresponding fluid distribution line 401, according to some embodiments. A leading edge 55, a bottom edge 56 and a trailing edge 57 of residue guide 50 are designated for reference.

With reference to FIG. 4b, each spray tip 41 of the pair for row unit 28 is shown mounted to trailing edge 57 of the corresponding guide 50 with each fluid distribution line 401 extending from the corresponding spray tip 41 upward, generally along trailing edge 57 of the corresponding guide 50, to underside 31 of frame 32 and then around to rearward portion 35 of frame 32. With reference to FIG. 4c, each spray tip 41 of the pair for row unit 48 is shown mounted to a central portion 575 of the corresponding guide 50 with each line 401 extending from corresponding spray tip 41 along a side of the corresponding guide 50, which side is opposite that from which spray tip 41 protrudes; each line 401 extends upward to underside 31 of frame 32 and then around to rearward portion 35 of frame 32. It should be noted that the area of guide 50 that is designated as the central portion 575 is not necessarily centered between leading edge 55 and trailing edge 57, but is offset from both, as shown. FIGS. 4b-c further illustrate a manifold 4011 to which each fluid distribution line 401 is coupled, according to some embodiments. Lines 401 and manifold 4011 may be formed from rubber and/or stainless steel or any other suitable material. The distribution of flow from a reservoir of the biodegrading agent for row crop header 30, according to some embodiments, will be described in greater detail below, in conjunction with FIGS. 14a-b. The scope of the present invention is not limited by the illustrated routing of lines 401 and manifold 4011, which is exemplary of some embodiments of the present invention, and any suitable alternative methods for routing may be employed, according to alternate embodiments.

With further reference to FIG. 4b, a mounting bracket 241 is attached in proximity to trailing edge 57 of each guide 50 in order to secure the corresponding spray tip 41 thereto; and, with further reference to FIG. 4c, a hole is formed through central portion 575 of each residue guide 50 in order to accommodate a generally annular mounting structure 441 that secures the corresponding spray tip 41 to central portion 575. Spray tip 41 may pass through structure 441 from a junction with the corresponding fluid distribution line 401, which is on the opposite side of the corresponding guide 50. Each bracket 241 and structure 441 may be bolted and/or welded to the corresponding guide 50 with the corresponding spray tip 41 either permanently or removably affixed thereto, according to any conventional coupling means known in the art. According to some alternate embodiments, each residue guide 50 has two or more spray tips 41 mounted thereto, wherein the two or more may be located adjacent one another, either along trailing edge 57 or at central portion 575, or in an array that extends from trailing edge 57 to central portion 575.

FIGS. 4b-c show spray tips 41 of each row unit 28, 48 being directed generally toward one another so that a spray of the agent, designated at least in part by the dotted lines, is directed onto the harvest residue that is guided between the corresponding pair of residue guides 50. FIGS. 4b-c further illustrate another optional spray tip 411 which is mounted to frame 32 in between opposing spray tips 41 and is directed to spray down upon the harvest residue, rearward of trailing edges 57 of guides 50. Each spray tip 411 may be directly welded to frame 32 or held in a bracket that is welded or bolted to frame 32. Although each tip 411 is shown located in proximity to an edge of frame where rearward portion 35 and underside 31 intersect, tips 411 may be located along underside 31, offset forward from this edge, toward guides 50 but rearward of the associated harvesting mechanism, for example, that includes crop rolls 36 (FIG. 4a). According to some alternate embodiments, only spray tips 411 are employed, without spray tips 41, and each row unit may include two or more spray tips 411 mounted to frame 32 between the corresponding guides 50.

FIG. 5 is a perspective view of residue guide 50, wherein particular features of a particular embodiment thereof are called out. For example, FIG. 5 illustrates residue guide 50 including a guide portion 52 and a mounting portion 54 for coupling the residue guide 50 to underside 31 of frame 32 of row crop header 30. In some embodiments, residue guide 50 may be formed by bending a single sheet of material, for example, sheet metal, to form guide portion 52 and mounting portion 54. The formation of a mounting portion and a guide portion could also be accomplished by a molding process (e.g., for a plastic or composite material). FIG. 5 also shows fasteners 58, for example, to couple residue guide 50 to frame 32 of row crop header 30 as described above. In some embodiments, residue guide 50 may have one or more apertures (not shown in FIG. 5) spaced along mounting portion 54 to facilitate the use of one or more fasteners 58. A fastener, such as a bolt or screw, may be readily available on certain row crop header frames, for example, and may be utilized along with the apertures of each residue guide 50 to couple each residue guide 50 to the row crop header 30. FIG. 5 illustrates bottom edge 56 of guide 50 extending downwardly from mounting portion 54, at an angle, such that leading edge 55 is shorter than trailing edge 57, however the particular shape of residue guide 50 shown in FIG. 5 is merely exemplary, and other shapes, including the use of curved and/or angled portions, could readily be used.

FIG. 6 is a bottom view of a pair of residue guides 50, according to some embodiments of the invention wherein mounting portion 54 of each includes apertures 60 that are elongate in shape and oriented to allow lateral adjustment of each residue guide 50 with respect to the other. Such adjustment may be performed on one or both residue guides 50 of a pair, for example, in order to adjust the width of strips 22 of guided harvest residue 20 (FIG. 1) and/or to prevent a pair of residue guides 50 from becoming clogged or plugged with harvest residue.

FIGS. 7-9 are side views of residue guides 50, according to some alternate embodiments of the invention. FIG. 7 illustrates residue guide 50 having a pivotable extension plate 62 coupled thereto so as to pivot about a point 64. Such an embodiment may be useful in allowing pivotable extension plate 62 to make contact with soil surface 11 during harvesting operations and to rotate about pivot point 64 when the extension plate 62 comes in contact with irregularities of soil surface 11, such as rocks, debris, roots, etc. According to some embodiments, pivot point 64 comprises a pin coupling or a swivel mount coupling, which is disposed between extension plate 62 and guide portion 52, but any suitable pivotable coupling known in the art may be employed. According to some preferred embodiments, extension plate 62 has a curved or beveled rear surface 63 that allows extension plate 62 to pivot such that the rear surface 63 is moved upwards when the harvesting machine is operated in a reverse direction, thereby providing some level of protection against damage to the equipment. FIG. 8 illustrates guide portion 52 of residue guide 50 hinged at the interface with mounting portion 54, according to some embodiments. A hinge 66 may extend the length of residue guide 50, or a number of hinges 66 may be employed to allow guide portion 52 to be pivoted up and into a stowage position 53, for example, during transportation of the harvesting equipment to and from the row crop field and/or over irregular terrain, and/or when row crop header 30 is separated from a drive, control and harvest collection unit of the harvesting machine and being transported on a header transport trailer. A fastener 69, for example, a bolt, may be used to hold the guide portion 52 in the stowed position, in some embodiments. A locking mechanism 68 may also be employed to lock guide portion 52 into a downward extending position when harvesting, according to some embodiments. FIG. 9 illustrates a residue guide 50, according to yet further embodiments, which, rather than being attached to frame 32 of row crop header 30, is integrally formed with frame 32 and/or row divider snoot 34.

Figure 12:
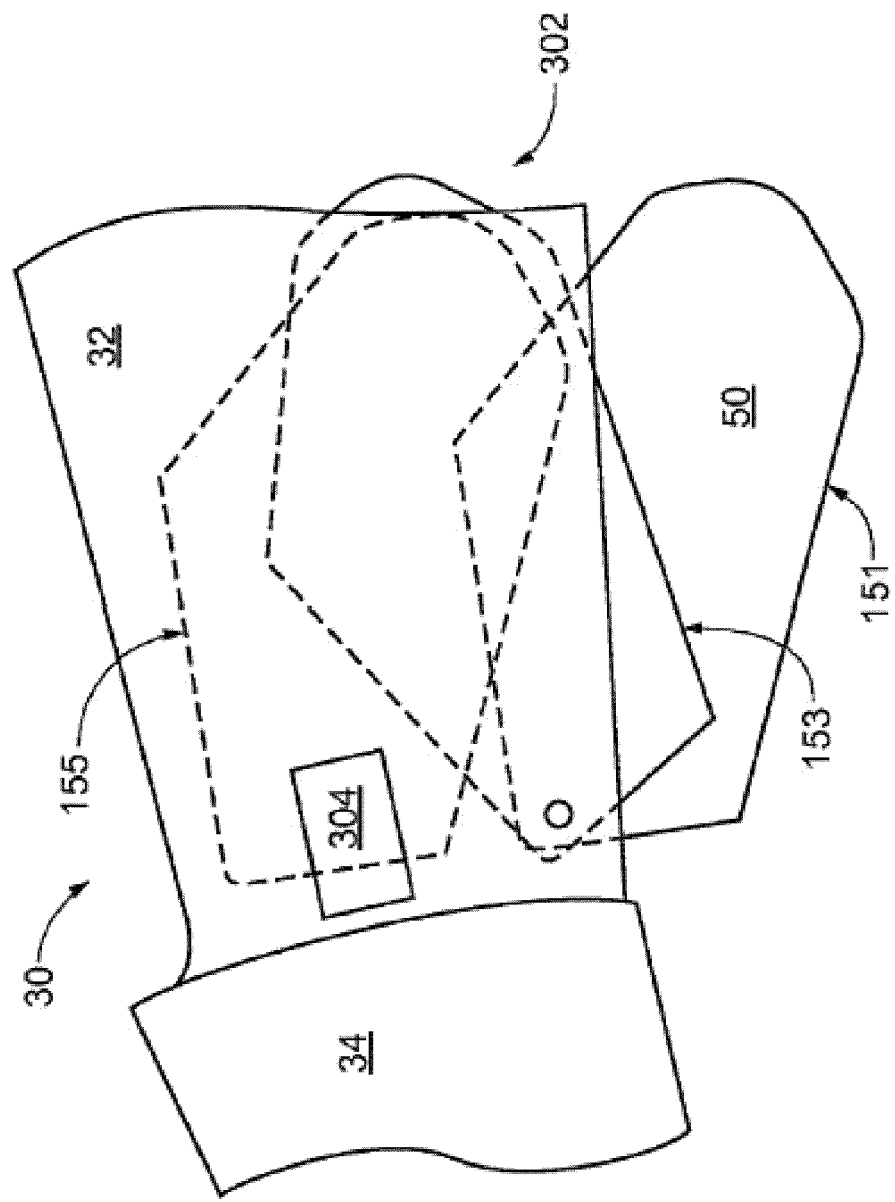
FIG. 12 is an enlarged side view of a portion of a row crop header including an integrated residue guide system, according to a particular embodiment.

FIG. 12 is an enlarged side view of a portion of a row crop header including an integrated residue guide system 302, according to a particular embodiment. Integrated system 302 may include, for example, residue guides 50 pivotably coupled to frame 32 of row crop header 30 and a motive force 304 (e.g., an electric motor) operatively coupled to each residue guide 50 to move each residue guide 50 between at least two positions, for example, from a harvest guiding position 151 to a stowage position 153 and/or from harvest guiding position 151 to a retracted position 155. In some embodiments, motive force 304 may be remotely actuated, for example, by an operator from within a cab of the harvesting machine.

FIGS. 10a and 10b show guide portion 52 of each residue guide 50 extending downwardly at angles other than vertical. In the embodiment of FIG. 10a, guide portions 52 of the illustrated pair of guides 50 extend toward one another in a downward direction from mounting portion 54, at an angle 70 from vertical, such that a distance between the guide portions becomes smaller nearer to soil surface 11. In the embodiment of FIG. 10b, guide portions 52 of the illustrated pair of guides 50 extend away from one another in a downward direction from mounting portion 54, at an angle 71 from vertical, such that the distance between the guide portions increases as you move downwardly.

FIG. 11 is a side view of a portion of row crop header 30 including a stalk stomper shoe 72, in accordance with certain embodiments of the invention. According to the illustrated embodiment, stalk stomper shoes 72, such as those manufactured by May-Wes Manufacturing ("Stalk Stompers"), may be operatively coupled to the frame 32, rearward of residue guides 50, using any suitable fasteners or attachment mechanisms as are known in the art. Attaching a stalk stomper shoe to a row unit of a row crop header may facilitate managing the placement of harvest residue in relatively narrow strips over the crop row being harvested, for example, by resiliently pushing down on harvest residue that passes through the residue guides.

Figure 13A:
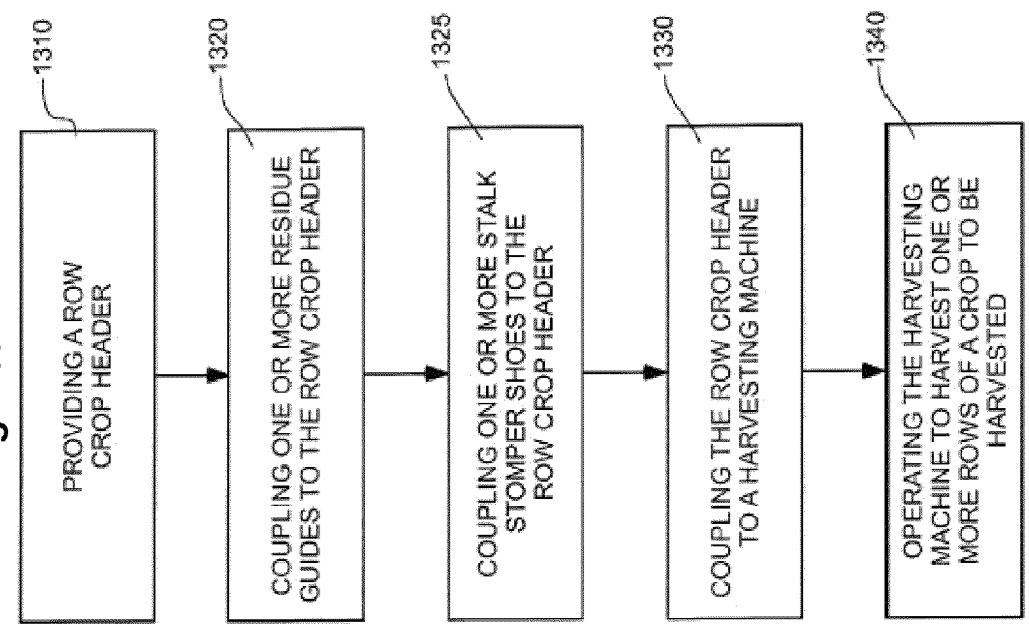
FIGS. 13a-b are flow charts outlining some methods of the invention.

FIG. 13a is a flow chart outlining some methods of the invention. In step 1310, a row crop header, such as a corn row header, is provided. The row crop header may, for example, be adapted to be operatively coupled to a harvesting machine (e.g., mounted to a front portion of a combine) to facilitate harvesting of crops grown in rows. The row crop header may have one or more row units adapted to receive one or more rows of a crop to be harvested. In step 1320, one or more residue guides are coupled to the row crop header. The residue guides may have a mounting portion for coupling the residue guide to the row crop header, and a guide portion extending downwardly from the row crop header. When coupling the one or more residue guides to the row crop header, the residue guides may be positioned such that harvest residue exiting the row crop header is directed by the residue guides into relatively narrow strips proximate the row being harvested.

With continued reference to FIG. 13a, step 1330 may include coupling the row crop header to a harvesting machine such as a combine. The harvesting machine is configured to receive rows of crops directed by the row crop header, and extract the harvest product (e.g., ears of corn) from the rest of the plant (e.g., corn stalks, tassels, and leaves). In step 1340, the harvesting machine is operated (e.g., transported through the rows of the crop) to harvest the one or more rows of the crop to be harvested. In some cases, this step involves driving a combine through a field parallel to the direction of crop rows such that the row crop header directs the rows of crops to be harvested into the harvesting machine. This may, for example, include aligning the row crop header with the crop rows such that each row is approximately centered between corresponding adjacent row divider snoots of the row crop header.

In some embodiments of the invention, the method may further comprise coupling one or more stalk stomper shoes to the row crop header rearward of the residue guides (at optional step 1325). For example, the row crop header may have a pair of residue guides associated with a given row (e.g., disposed on either side of the intended row center), and may further have a stalk stomper shoe coupled to the row crop header (e.g., coupled to the frame of the row crop header) rearward of the pair of residue guides. In a preferred embodiment, the stalk stomper shoe would be mounted substantially centered on the intended row center such that it functions to push downwardly on harvest residue that has been guided by the residue guides.

Figure 13B:
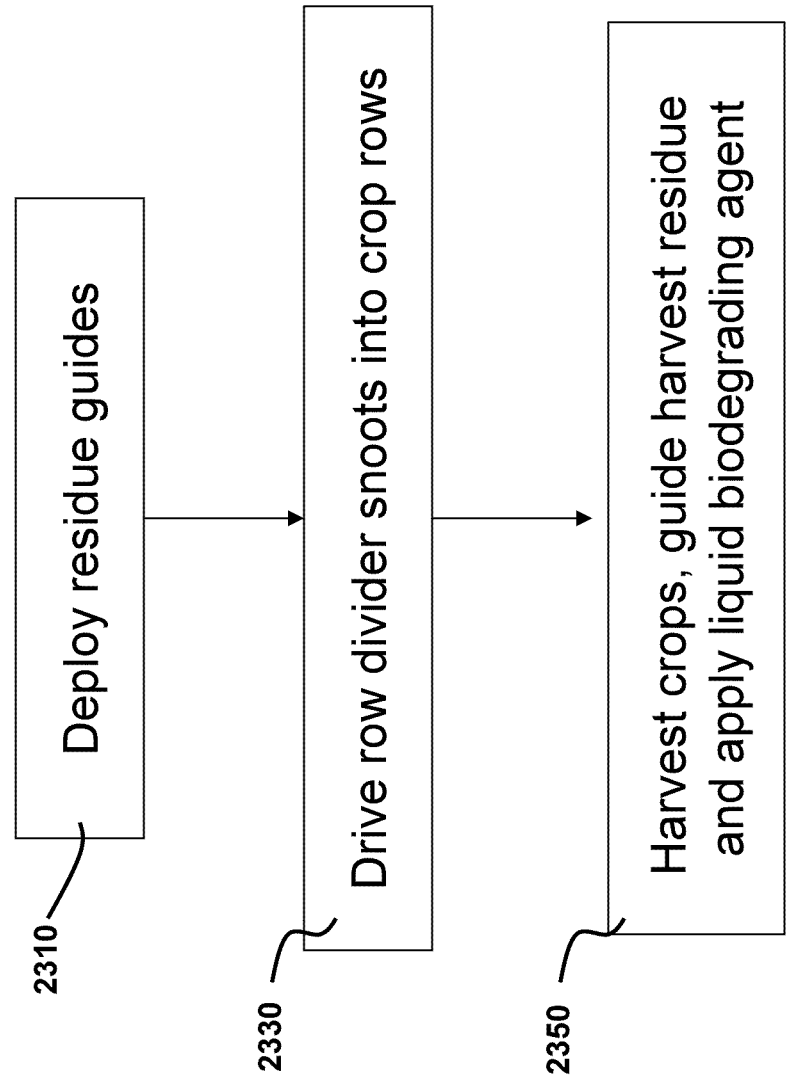

FIG. 13b is a flow chart outlining some additional methods of the present invention, wherein harvest residue guides are deployed, per step 2310, prior to driving a plurality of row divider snoots into a plurality of crop rows, per step 2330, and wherein the harvesting of the crops, the guiding of the associated harvest residue and the applying of a liquid biodegrading agent are all carried out, essentially simultaneously, per step 2350, by the harvesting machine as the row crop header, led by the corresponding plurality of row divider snoots is being driven through the crop rows. Pairs of residue guides 50 are deployed in conjunction with a row crop header 30, as described above, to guide harvest residue 20 that is generated by each harvesting mechanism, for example, including stalk rolls 36; and spray tips, such as spray tips 41 and/or tips 411 (FIGS. 4b-c) are employed to apply the liquid biodegrading agent to harvest residue 20 in proximity to each pair of guides 50, as the guides guide the harvest residue 20 into strips 22 (FIG. 1). The type of biodegrading agent applied may be any suitable commercially available liquid fertilizer such as 28% UAN, and/or organic liquids such as organic fish emulsions, that are designed to provide a source of nutrition for organisms that break down/consume/degrades the harvest residue so that the residue will not interfere with subsequent crop operations and may become available, in a shorter period of time, as a new fertilizer source for subsequent crops. According to methods of the present invention, the application of biodegrading agents to the guided residue at the time of harvesting, during and immediately following the guiding thereof, is advantageous in that the application of the agent is directed to enable thorough residue coverage, and provides an immediate nutrient source to bacteria and fungi that enter crop stalks, which have just been processed (damaged) by the header stalk rolls. This method starts the decomposition of the residue as soon as possible.

FIG. 14a is a rear elevation schematic of row crop header 30, according to some preferred embodiments; and FIG. 14b is a perspective view of a harvesting machine 1400, wherein row crop header 30 and a drive, control and harvest collection unit 1430 of machine 1400 are positioned side-by-side, row crop header 30 having been detached from unit 1430 for the purpose of illustration. FIG. 14a illustrates a plurality of spray tips 41 and an associated plurality of fluid distribution lines 401 included in the assembly of header 30 and arranged, according to some embodiments of the present invention, in order to apply the liquid biodegrading agent, per step 2350 of FIG. 13b. FIGS. 14a-b illustrate row crop header 30 having a left side 30L and a right side 30R that extend in opposite directions from an orifice 1415 of the header, through which harvest is transported for collection, per arrow C, into a feeder housing area 49 of unit 1430, having been fed thereto by cross augers 1410, when header 30 is attached to unit 1430, for example, via an attachment receptacle 435A of unit 1430 mating with an attachment fitting 435B of header 30.

According to FIG. 14a, header 30 includes three row units 428L (one of which labeled with reference numerals) spaced apart from one another along left side 30L, and three row units 428R (one of which labeled with reference numerals) spaced apart from one another along right side 30R, wherein each unit 428L, 428R includes a group of three spray tips 41, 411 that may be mounted, arranged and configured according to any of the embodiments previously described in conjunction with FIGS. 4b-c. (It should be noted that any number of row units may be included in a header of the present invention and that FIG. 14a, as a schematic representation, does not show the same number of row units as would be included in header 30 as illustrated in FIG. 14b, which shows header 30 having a greater number of row divider snoots 34.) FIG. 14a further illustrates the previously described manifold 4011 divided into a first manifold 4011L and a second manifold 4011R, wherein each manifold 4011L, 4011R connects in series a group of feeder lines 401 of the corresponding side 30L, 30R of header 30 and includes a corresponding quick connect coupling 451LB, 451RB.

With reference to FIG. 14b, dashed lines show a feeder line 45, which is coupled to a tank 47 that contains at least part of the reservoir of biodegrading agent for application to the harvest residue. According to FIG. 14b, tank 47 and feeder line 45 are located on the right side of unit 1430 and line 45 terminates in a mating quick connect coupling 451RA for connection to coupling 451RB of header 30, when header 30 is attached to unit 1430, in order to provide flow of the agent through spray tips 41, 411 of row units 428R. FIG. 14b further illustrates a mating quick connect coupling 351LA on the left side of unit 1430 that terminates a corresponding feeder line (not shown), which may extend along the left side of unit 1430 to couple to a corresponding tank (not shown), or may extend to the right side of unit 1430 to couple to tank 47. Like coupling 451RA, coupling 451LA mates with coupling 451LB of header 30, when header 30 is attached to unit 1430, in order to provide flow of the agent through spray tips 41, 411 of row units 428L, according to the illustrated embodiment. According to some preferred embodiments, unit 1430 includes two tanks 47, each one mounted to a corresponding side of a lower frame of unit 1430; each tank may hold approximately half of a total volume of the reservoir of the biodegrading agent, which may be between approximately 100 gallons and 300 gallons. Each flow source line may extend from the corresponding tank, on either side of unit 1430, inside the corresponding front tire, above the front axle thereof, and pass alongside feeder housing area 49 to the corresponding quick connect coupling. With further reference to FIGS. 14a-b, it should be noted that, according to alternate embodiments, manifold 4011L and 4011R are in fluid communication with one another (per dashed line of FIG. 14a) to form a single manifold, and a single mating pair of quick connect couplings, for example, couplings 451RB and 451RA, is included for connection of the single manifold to a single feeder line of unit 1430, for example, feeder line 45. According to yet further embodiments, each row unit 428L, 428R may be independently plumbed to one or more quick connect couplings on row crop header 30 for mating with each of one or more couplings on unit 1430.

FIG. 14b further illustrates a cab 46 of unit 1430 from which an operator of harvesting machine 1400 can activate spraying of the liquid biodegradable agent and control the flow thereof through the spray tips 41, 411 of header 30, when header 30 is attached to unit 1430. One of many commercially available spray/flow controllers may be employed by harvesting machine 1400 to provide on/off control and flow rate control, for example, by varying pressure in the one or more feeder lines (e.g. feeder line 45).

In the foregoing detailed description, the invention has been described with reference to specific embodiments. However, it may be appreciated that various modifications and changes can be made without departing from the scope of the invention as set forth in the appended claims.

The invention claimed is:

1. A harvesting machine comprising:
   a drive, control and harvest collection unit;
   a row crop header attached to the unit, the row crop header including a plurality of row divider snoots spaced apart from one another along a width of the row crop header the row divider snoots having a longitudinal axis, a pair of stalk rolls associated with each pair of adjacent row divider snoots, the pair of stalk rolls having a longitudinal axis that is substantially parallel with the longitudinal axis of the row divider snoot, a pair of residue guides associated with each pair of stalk rolls, a plurality of fluid distribution lines and a corresponding plurality of spray tips, each spray tip terminating a corresponding line of the plurality of fluid distribution lines; and
   at least one tank for holding a reservoir of liquid biodegrading agent, the at least one tank being adapted for coupling to the plurality of fluid distribution lines; and
   wherein each pair of stalk rolls is located between a corresponding pair of adjacent row divider snoots to define a narrow region between the pair of stalk rolls and each pair of residue guides is located adjacent to a corresponding pair of stalk rolls with one residue guide on an outer side of each pair of stalk rolls outside of the narrow region defined between the pair of stalk rolls and rearward of the corresponding pair of adjacent row divider snoots, each residue guide extending downwardly from an underside of a frame of the row crop header, such that harvest residue from each crop row, that has been harvested by the harvesting machine, is guided by a corresponding pair of residue guides and stalk rolls into a strip that is left on the ground behind the harvesting machine in the location of the harvested crop row; and
   each spray tip of the plurality of spray tips is mounted in proximity to a corresponding pair of residue guides and directed to spray the liquid biodegrading agent onto the harvest residue between the residue guides.

2. The harvesting machine of claim 1, wherein the plurality of spray tips includes a pair of spray tips associated with each pair of residue guides, each spray tip of the pair being mounted to a corresponding residue guide.

3. The harvesting machine of claim 2, wherein each spray tip of each pair of spray tips is mounted to a trailing edge of the corresponding residue guide.

4. The harvesting machine of claim 2, wherein each spray tip of each pair of spray tips is mounted to a central portion of the corresponding residue guide.

5. The harvesting machine of claim 1, wherein the plurality of spray tips includes a group of at least three spray tips associated with each pair of residue guides, each spray tip of two spray tips of each group of spray tips being mounted to a corresponding residue guide, and a third spray tip of each group of spray tips being mounted in between the corresponding other two spray tips.

6. The harvesting machine of claim 5, wherein each spray tip of the two spray tips of each group of spray tips is mounted to a trailing edge of the corresponding residue guide, and the third spray tip of each group of spray tips is mounted to the frame of the row crop header.

7. The harvesting machine of claim 5, wherein each spray tip of the two spray tips of each group of spray tips is mounted to a central portion of the corresponding residue guide, and the third spray tip of each group of spray tips is mounted to the frame of the row crop header.

8. The harvesting machine of claim 1, further comprising:
   a first feeder line coupled to a first tank of the at least one tank; and
   a second feeder line coupled to a second tank of the at least one tank; and
   wherein the plurality of fluid distribution lines includes first and second groups of fluid distribution lines, the first group being connected in series by a first manifold that extends along a left side of the row crop header, and the second group being connected in series by a second manifold that extends along a right side of the row crop header;
   the first feeder line extends generally along a left side of the unit, from the first tank to a coupling with the first manifold; and
   the second feeder line extends generally along a right side of the unit, from the second tank to a coupling with the second manifold.

9. A row crop header for attachment to a drive, control and harvest collection unit of a harvesting machine, the row crop header comprising:
   a plurality of row divider snoots spaced apart from one another along a width of the row crop header, the row divider snoots having a longitudinal axis;
   a pair of stalk rolls associated with each pair of adjacent row divider snoots, each pair of stalk rolls being located between a corresponding pair of adjacent row divider snoots and each pair of stalk rolls having a longitudinal axis that is substantially parallel with the longitudinal axis of the row divider snoots;
   a plurality of pairs of residue guides, each pair of residue guides being located adjacent to a corresponding pair of stalk rolls and rearward of the corresponding pair of adjacent row divider snoots, each residue guide extending downwardly from an underside of a frame of the row crop header, such that harvest residue from each crop row, that has been harvested by the harvesting machine, when the row crop header is attached to the unit thereof, is guided by a corresponding pair of residue guides and stalk rolls into a strip that is left behind the harvesting machine in the location of the harvested crop row;
   a plurality of fluid distribution lines including at least one connector for coupling each of the plurality of fluid distribution lines to a reservoir of liquid biodegrading agent, when the row crop header is attached to the unit of the harvesting machine, the reservoir being carried on the unit; and a corresponding plurality of spray tips, each spray tip terminating a corresponding line of the plurality of fluid distribution lines and being mounted in proximity to a corresponding pair of residue guides and directed to spray the liquid biodegrading agent onto the harvest residue.

10. The row crop header of claim 9, wherein a pair of spray tips associated with each pair of residue guides, each spray tip of the pair being mounted to a corresponding residue guide.

11. The row crop header of claim 10, wherein each spray tip of each pair of spray tips is mounted to a trailing edge of the corresponding residue guide.

12. The row crop header of claim 10, wherein each spray tip of each pair of spray tips is mounted to a central portion of the corresponding residue guide.

13. The row crop header of claim 9, wherein the plurality of spray tips includes a group of at least three spray tips associated with each pair of residue guides, each spray tip of two spray tips of each group of spray tips being mounted to a corresponding residue guide, and a third spray tip of each group of spray tips being mounted in between the corresponding other two spray tips.

14. The row crop header of claim 13, wherein each spray tip of the two spray tips of each group of spray tips is mounted to a trailing edge of the corresponding residue guide, and the third spray tip of each group of spray tips is mounted to the frame of the row crop header.

15. The row crop header of claim 13, wherein each spray tip of the two spray tips of each group of spray tips is mounted to a central portion of the corresponding residue guide, and the third spray tip of each group of spray tips is mounted to the frame of the row crop header.

\* \* \* \* \*